No. 841,073. PATENTED JAN. 8, 1907.
M. G. BUNNELL.
AUTOMOBILE DITCHING AND GRADING MACHINE.
APPLICATION FILED DEC. 28, 1901.
6 SHEETS—SHEET 1.
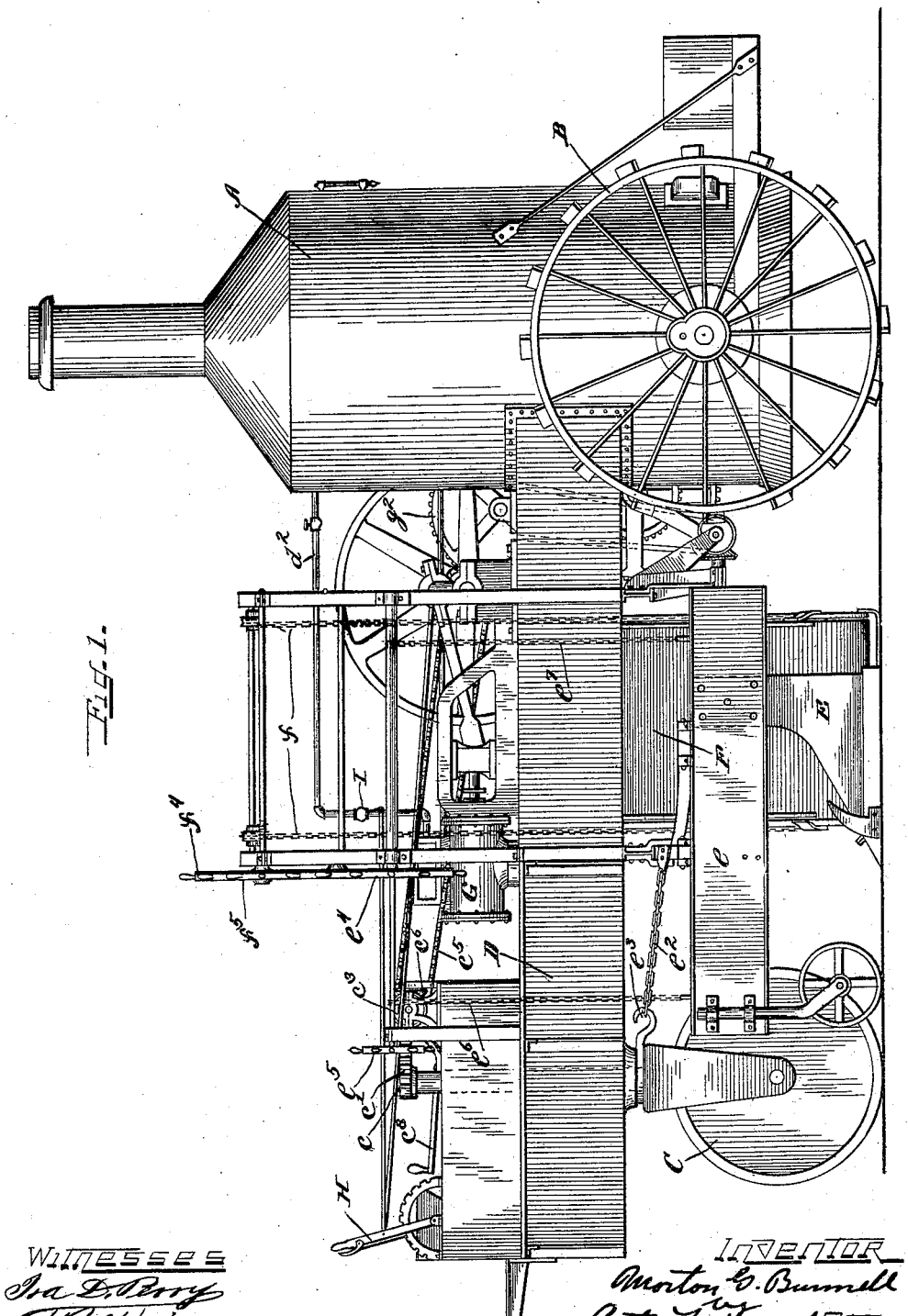

No. 841,073. PATENTED JAN. 8, 1907.
M. G. BUNNELL.
AUTOMOBILE DITCHING AND GRADING MACHINE.
APPLICATION FILED DEC. 28, 1901.
6 SHEETS—SHEET 2.
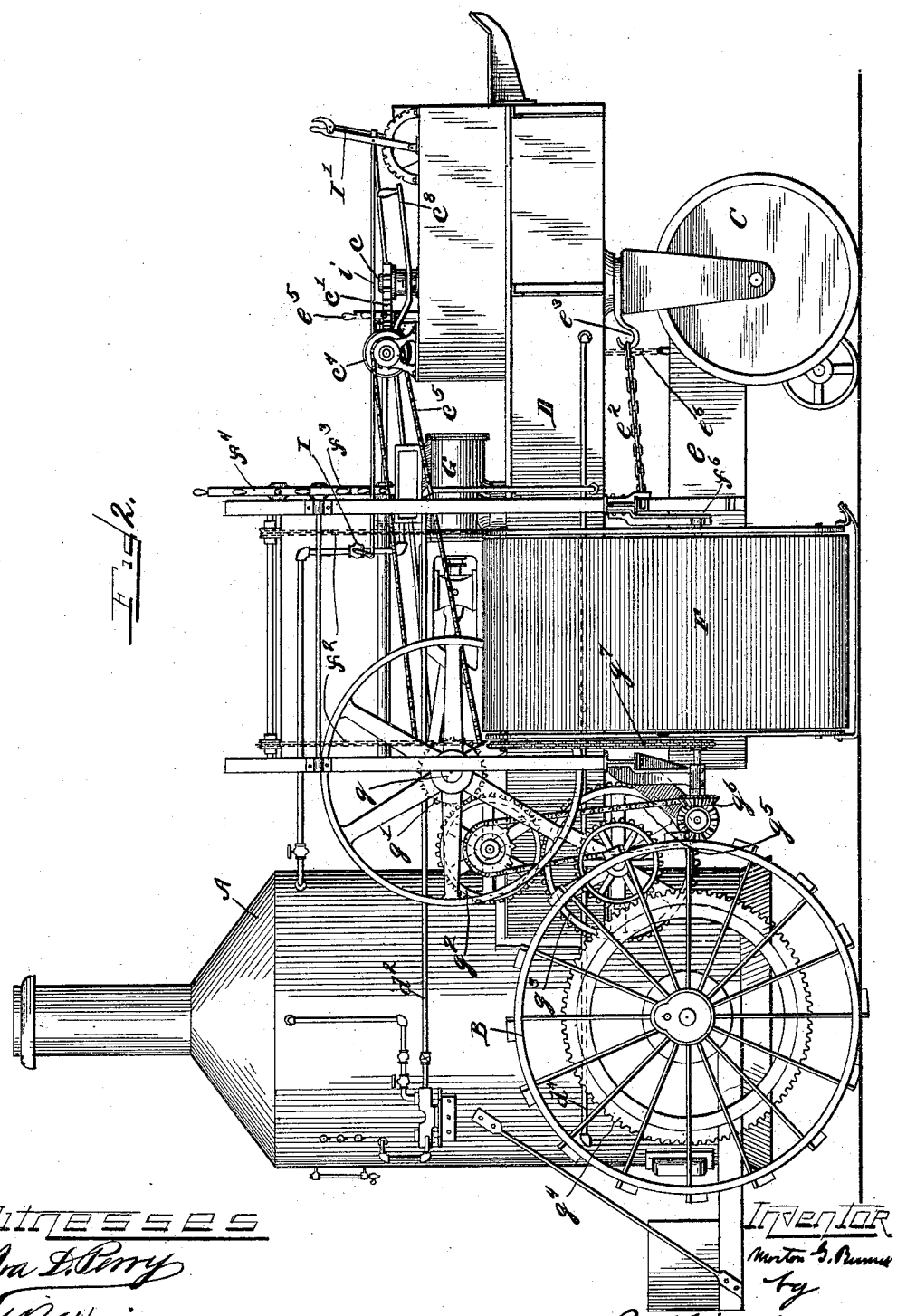

No. 841,073. PATENTED JAN. 8, 1907.
M. G. BUNNELL.
AUTOMOBILE DITCHING AND GRADING MACHINE.
APPLICATION FILED DEC. 28, 1901.
6 SHEETS—SHEET 3.
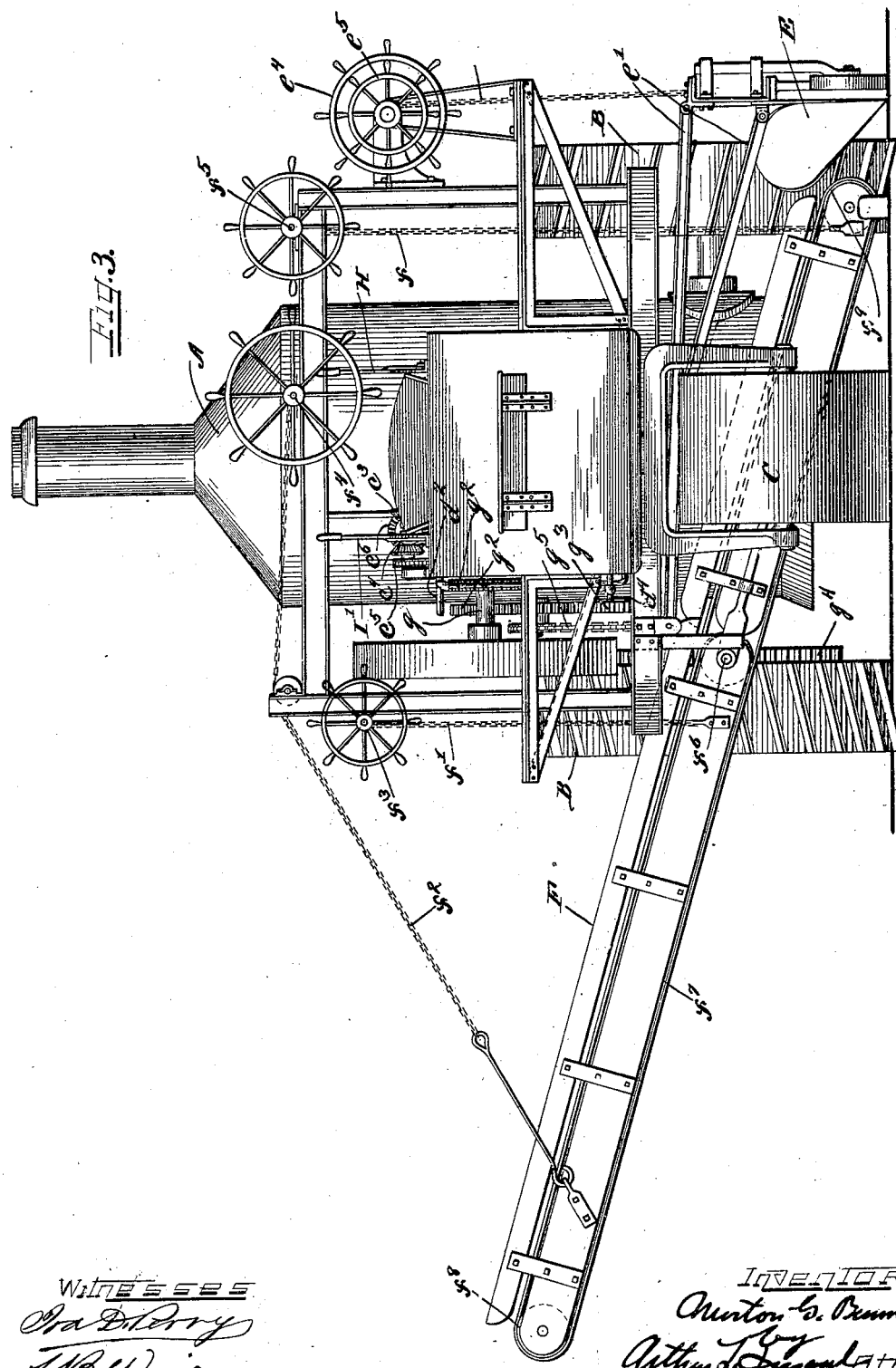

No. 841,073. PATENTED JAN. 8, 1907.
M. G. BUNNELL.
AUTOMOBILE DITCHING AND GRADING MACHINE.
APPLICATION FILED DEC. 28, 1901.
6 SHEETS—SHEET 4.
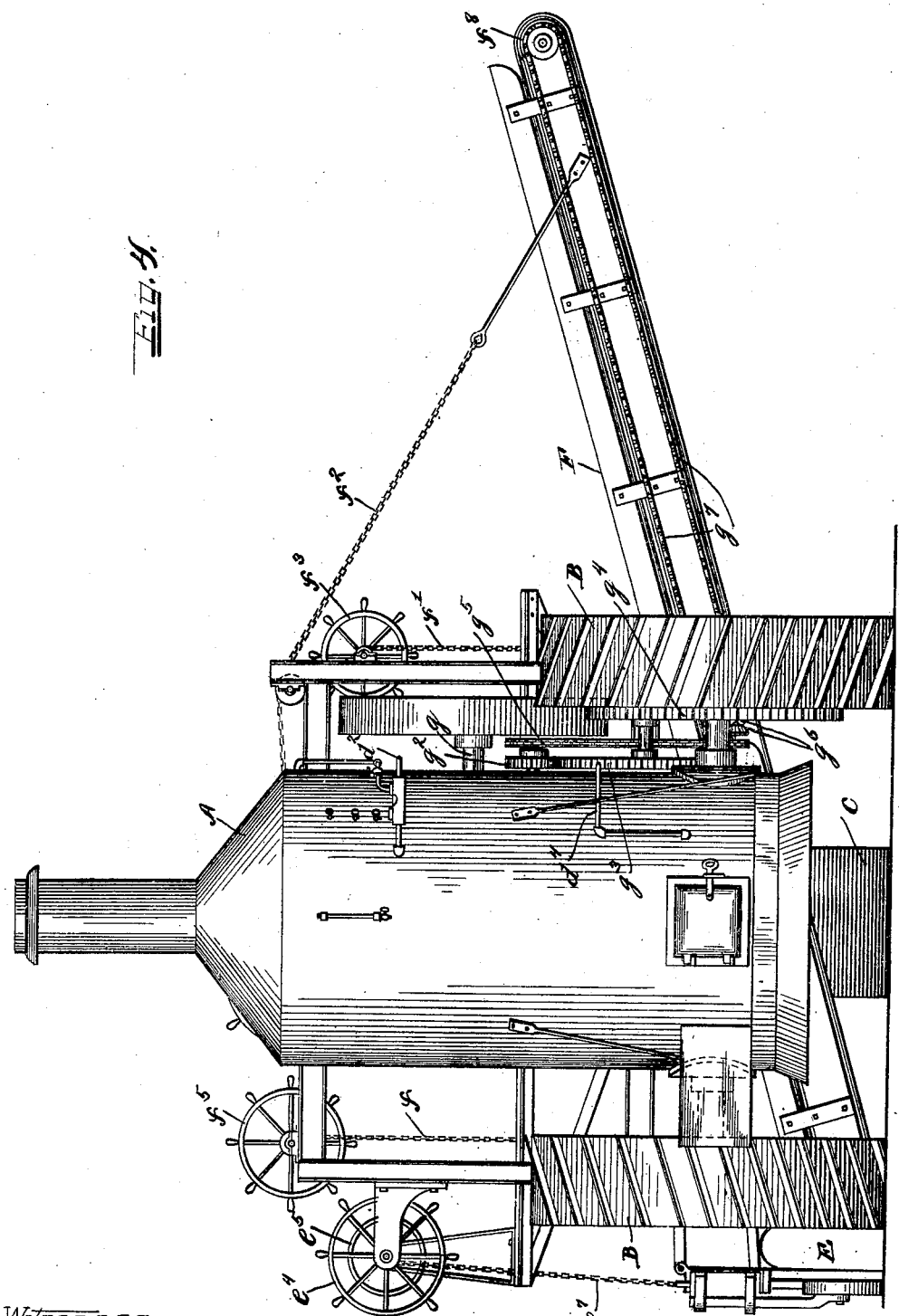

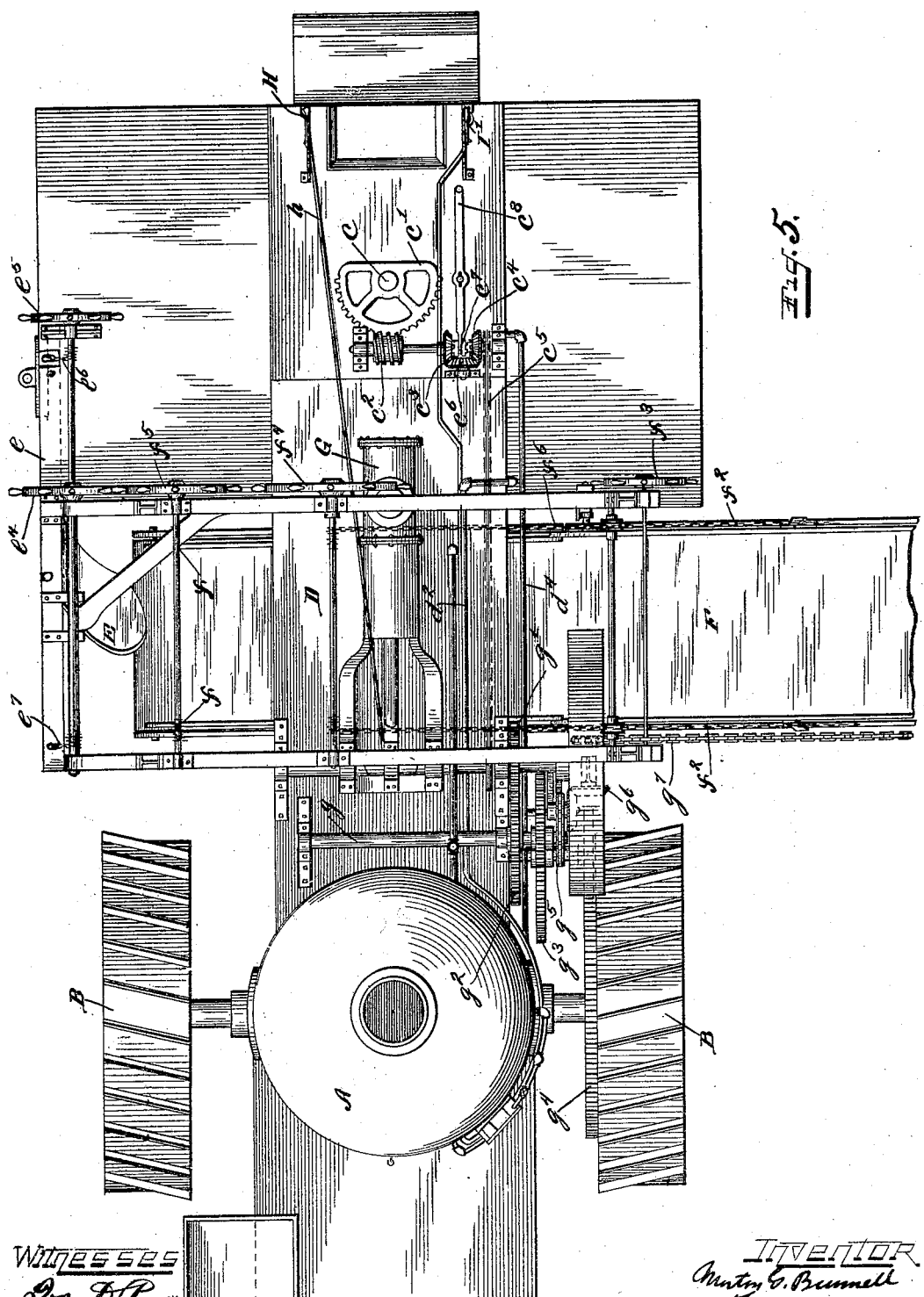

No. 841,073. PATENTED JAN. 8, 1907.
M. G. BUNNELL.
AUTOMOBILE DITCHING AND GRADING MACHINE.
APPLICATION FILED DEC. 28, 1901.
6 SHEETS—SHEET 6.
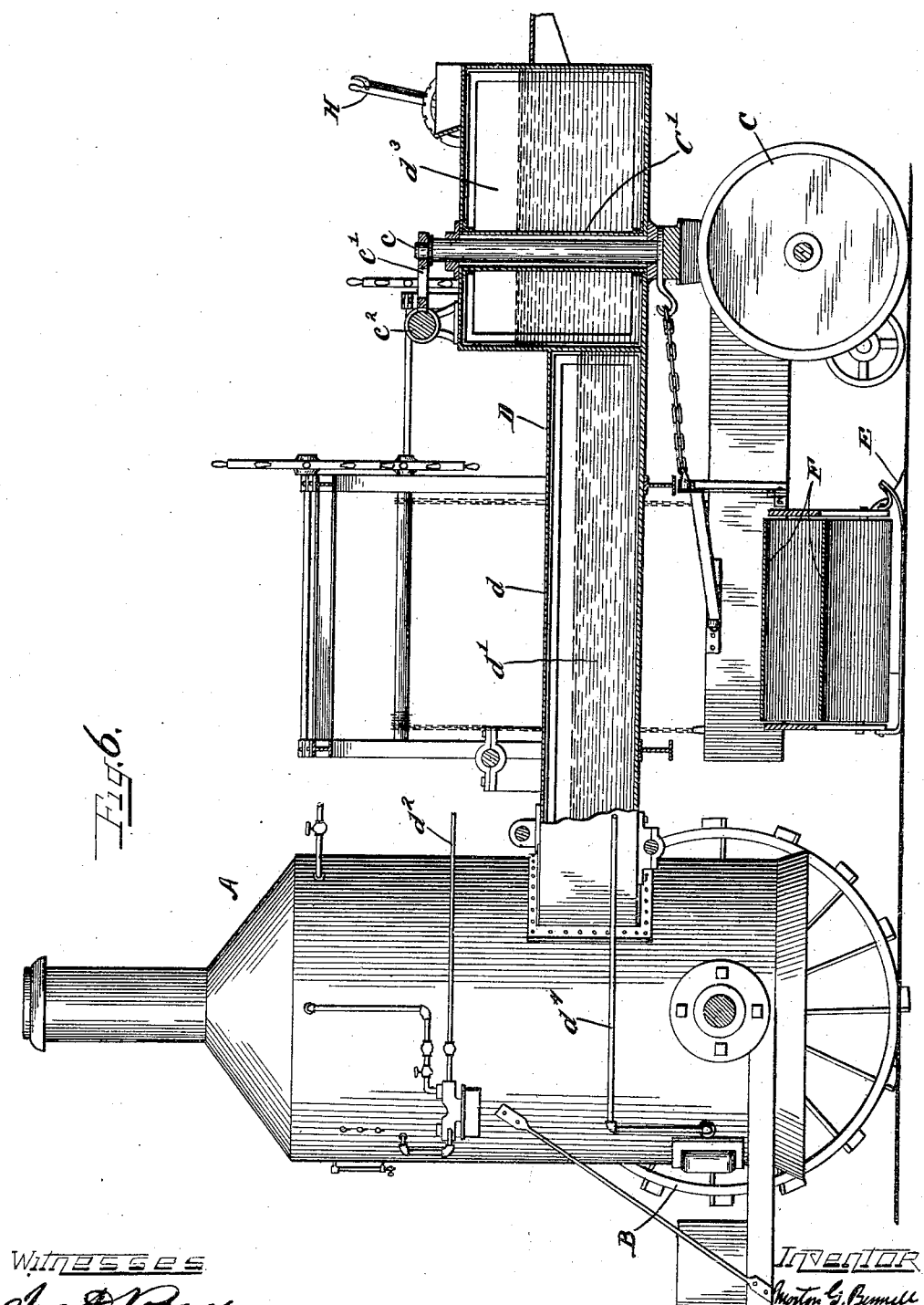

UNITED STATES PATENT OFFICE.

MORTON G. BUNNELL, OF CHICAGO, ILLINOIS, ASSIGNOR TO WESTERN WHEELED SCRAPER CO., OF AURORA, ILLINOIS.

AUTOMOBILE DITCHING AND GRADING MACHINE.

No. 841,073.      Specification of Letters Patent.      Patented Jan. 8, 1907.

Application filed December 28, 1901. Serial No. 87,549.

*To all whom it may concern:*

Be it known that I, MORTON G. BUNNELL, a citizen of the United States, and a resident of Chicago, in the county of Cook and State of Illinois, have invented certain new and useful Improvements in Automobile Grading and Ditching Machines, of which the following is a specification.

My invention relates to grading and ditching machines of that type in which a plow is arranged for a side delivery to the lower end of a belt conveyer.

My invention relates more particularly to ditching and grading machines of this character which are propelled by steam or other motive power.

Generally stated, the object of my invention is to provide a simple and efficient construction of self-propelling ditching and grading machine and to provide a construction and arrangement of parts which will insure the best results.

Certain special objects are to provide a construction and arrangement which will tend to facilitate the operation of a machine of this character.

It is also an object of my invention to provide a construction and arrangement which will permit the use of certain parts or portions of the body structure, as tanks for holding water, oil, or other fluids.

A further object is to secure a better and more effective distribution of the weight, and particularly to throw as much weight as possible upon the traction-wheels. I also provide an arrangement which permits the steering and running of the machine and also the operation of the belt conveyer to be controlled in an advantageous manner by a single attendant.

The nature and operation of my invention together with further advantages will, however, hereinafter more fully appear.

In the accompanying drawings, Figure 1 shows the plow side of an automobile grading and ditching machine embodying the principles of my invention. Fig. 2 shows the conveyer side of the machine shown in Fig. 1. Fig. 3 is a front elevation of said machine. Fig. 4 is a rear elevation of the same machine. Fig. 5 is a plan of the machine shown in the preceding figures. Fig. 6 is a side elevation with certain portions broken away so as to show the forwardly-extending body structure in section.

As thus illustrated, my invention comprises, preferably, an upright boiler A, which is preferably supported between traction-wheels B. A steering wheel or roller C is also preferably employed and arranged, as shown, at the forward portion of the machine. The frame or body structure D preferably extends forward from the said boiler, and the forward portion of this frame or body structure is supported by the steering wheel or roller C. The plow E, which, it will be understood, can be of any suitable form or construction, is preferably arranged at one side of the machine. The conveyer F, which, it will be understood, can be of any suitable form or construction, is preferably supported transversely below the frame or body structure D and has its lower end arranged in position to receive the soil from the side of the plow E. The plow-beam $e$ can be connected with the farther side of the frame or body structure by means of one or more swinging bars $e'$, so connected at their ends as to permit a free up-and-down or vertical adjustment of the plow. It will also be understood that this swinging connection of the plow with the frame or body structure of the machine is preferably adapted to sustain the draft of the plow—for example, through the medium of the draft-chain $e^2$, which can be secured to a hook $e^3$ on the stem of the steering-wheel C. As a means for raising and lowering said plow hand-wheels $e^4$ and $e^5$ can be provided, and the shaft and sleeve of these two hand-wheels can be connected with the plow through the medium of chains $e^6$ and $e^7$. With this arrangement the plow can be raised and lowered bodily or, if desired, it can be tilted, so as to either depress or raise its point. The conveyer F is preferably of a length to discharge the dirt at some distance from the side of the machine. As in the case of the plow, this conveyer can be supported for vertical or up-and-down adjustment by chains $f\ f'\ f^2$, having their upper portions wound upon the hand-wheel shafts $f^3\ f^4\ f^5$. With the arrangement and location of these hand-wheel shafts it is obvious that the said conveyer can be either raised or lowered bodily or, if desired, tilted, so as to vary its incline. Preferably the said conveyer is made in two sections and jointed at $f^6$. It will be readily understood that the said conveyer is preferably of the endless-belt form, being provided with the carrying-belt $f^7$, arranged upon rolls $f^8$ and $f^9$. All of said hand-wheel shafts, it will be observed, are mounted upon the frame or superstructure rising from the body structure D. As a means for propelling the machine and also as a means for running the conveyer-belt of the conveyer an engine G is preferably provided. As a simple and effective arrangement this engine can be mounted upon the frame or body structure D. With this arrangement the engine-shaft $g$ is preferably gear-connected with the traction-wheels B through the medium of the gear-wheels $g'$, $g^2$, $g^3$, and $g^4$. It will also be observed that the belt conveyer is connected with the said gear-wheel $g^2$ through the medium of a sprocket-chain $g^5$, the bevel-gearing $g^6$, and the relatively long sprocket-chain $g^7$. It will be readily understood, however, that the power-transmitting connection between the engine and the traction-wheels and also between the engine and the conveyer can be of any suitable form or character. With power-transmitting connection thus arranged between the engine and traction-wheels and the conveyer the machine is rendered self-propelling, and the motive power is also advantageously employed as the means for driving the belt conveyer.

If desired, the motive power can also be employed for steering the machine. For example, the spindle $c$ of the steering-wheel can be provided at its upper end with a segmental rack $c'$, and a worm $c^2$ can be provided and adapted to engage said segmental rack. The worm $c^2$ is, it will be observed, mounted upon a shaft having a bevel-gear $c^3$ and bevel-gear $c^4$, and also having a sprocket-chain connected with the engine-shaft through the medium of the sprocket-chain $c^5$. An intermediate bevel-gear $c^6$ is also provided and arranged to engage the bevels on said shaft. All of these bevels can, however, if desired, be dispensed with and equivalent frictional contacts employed instead. With this arrangement the bevels $c^3$ and $c^4$ are preferably loose upon the shaft, as is also the sprocket-chain $c^5$. Intermediate of the bevels $c^3$ and $c^4$ a clutch member $c^7$ can be provided, and this clutch member is preferably keyed by a spline to the shaft. This clutch member is adapted to be reciprocated between the two bevels $c^3$ and $c^4$, so as to engage either bevel, and in this way the rotation of the shaft on which the worm $c^2$ is mounted can be quickly and readily reversed. A lever $c^8$ is preferably provided for operating the clutch member $c^7$. In running straight ahead the said clutch member is adjusted to a position midway between the two bevels, and when so adjusted the said bevels and the sprocket-chain run idly and without revolving the worm-shaft. Should it be desired, however, to change the direction of the machine, it is then only necessary to shift the clutch member by means of the lever $c^8$, so as to throw said clutch into engagement with either of the bevels $c^3$ or $c^4$. In this way the operator can turn the steering-wheel by simply manipulating the lever $c^8$. It will readily be understood, however, that any suitable or desired arrangement can be employed for enabling the operator to use the motive power for steering the machine. Any suitable arrangement can be employed for reversing the engine—as, for example, the lever H, provided with a rod extending rearwardly to the eccentric of the said engine. A suitable throttle-valve I can also be provided, and this throttle-valve can be controlled by a lever I' through the medium of a rod $i$. It will also be understood that any suitable clutch arrangement can be employed for disconnecting the power from the conveyer-belt, so as to permit the engine to run and propel the machine without running the belt of the elevator.

With the boiler thus advantageously located between the traction-wheels, so as to increase the tractive power of the machine, the forwardly-extending body structure D can, if desired, be constructed to serve as a tank for containing water, oil, or other fluids. For example, the middle or waist portion $d$ must be not only of a character to suitably support the plow and belt conveyer, but can also be made hollow and adapted to provide a water-chamber $d'$. With this arrangement the machine is capable of carrying an ample supply of water, which can be conducted to the boiler in any suitable manner—as, for example, by a pipe $d^2$. Furthermore, the front portion of said frame or body structure can be made hollow and adapted to provide an oil-chamber $d^3$. The oil from this chamber can be conducted to the fire-box of the boiler through a pipe $d^4$. In this way the frame or body structure of the machine is made to serve both as a supporting structure and as a carrying-tank for the water, oil, or other fluids employed in driving the engine.

The spindle $c$ can be arranged to extend upwardly through a sleeve $c'$, so as to prevent leakage from the tank $d^3$. This steering wheel or roll $c$ is, it will be seen, in the nature of a caster-wheel, and, if desired, it can be made broad enough to serve as a sort of roller.

Thus it will be seen that with the foregoing construction and arrangement the tractive power of the machine is increased by throwing the entire weight of the boiler upon the traction-wheels. Furthermore, it will be seen that with the upright boiler and with the forwardly-extending tank or body structure a more suitable supporting structure is provided for the plow and belt conveyer, and, furthermore, the arrangement permits the body structure D to serve as a platform or foot-board for the operator. The machine can of course be driven in either direction, according to the character of the work. The construction and arrangement of the waist portion and also the head or forward portion of the body being such as to serve as a tank for carrying water and oil obviates the necessity of encumbering the boiler foot-board with water-tanks or coal-boxes and permits the machine as a whole to be advantageously shortened and reduced to a compact and simple form. As another advantage the construction and arrangement secure a better and more advantageous distribution of the strains incident to running the machine and of the severe strains which may be encountered in heavy work. With the arrangement shown and described the gearing for communicating power and motion to the conveyer can be controlled independently of the power-transmitting connection between the engine and the traction-wheels. In this way the conveyer can be operated while the machine is standing still. Furthermore, these power-transmitting connections can, it will be observed, be controlled by controlling devices located at the forward end of the machine. This brings the operation of the machine completely under the control of one or more operators at the forward end of the machine. In addition to this the power-transmitting connection for operating the steering mechanism can also be controlled by a lever or other device at the forward end of the machine and of course independently of the other power-transmitting connections. In other words, the prime mover of the machine can be employed for operating all three instrumentalities—that is to say, the traction-wheels, conveyer, and steering mechanism—and the control of each can be independent of the other. The tank not only serves as medium of connection between the boiler and the forward running-gear or between the rear and forward wheels, but also serves as a strain-receiving member for sustaining the weight of the conveyer and also of the plow when the latter is raised from the ground. As previously stated, however, it will be readily understood that the excavating and elevating devices and also the engine, gearing, and steering devices can be of any suitable or desired form or character. These are all features which can be varied or changed without departing from the spirit of my invention.

What I claim as my invention is—

1. An excavating-machine, comprising traction-wheels, an upright boiler, a frame or body structure extending forwardly from this boiler, a plow arranged at one side of said frame or body structure, a conveyer arranged transversely below said frame or body structure, the lower end of said conveyer being adapted and arranged to receive the dirt from said plow, an engine mounted upon said frame or body structure and connected with said boiler, power-transmitting connection between said engine and traction-wheels, and also between the engine and the conveyer, and forward running-gear for steering the said excavating-machine.

2. An excavating-machine, comprising a pair of rear traction-wheels, an upright boiler supported between said traction-wheels, forward running-gear for steering the machine, a forwardly-extending frame or body structure connecting said boiler with said running-gear, a plow suspended at one side of the waist portion of said frame or body structure, a belt conveyer suspended transversely below the waist portion of said frame or body structure, an engine mounted upon the waist portion of said frame or body structure, suitable power-transmitting connection between said engine and said traction-wheels, and suitable power-transmitting connection between said engine and said conveyer.

3. A traction-engine with an upright boiler and a forwardly-extending frame or body structure, and a plow and belt conveyer suspended from adjusting devices mounted upon the waist portion of said forwardly-extending frame or body structure, said adjusting devices being operable from the forward portion of the machine.

4. In a steam-propelled excavating and grading machine, the combination of traction and steering wheels, an upright boiler supported between the traction-wheels, a frame connecting the boiler with the forward running-gear, the frame and boiler serving as connection between the front and rear wheels, a suitable engine mounted upon said frame and connected with the boiler, a grading implement arranged to operate at one side of said frame, adjusting devices mounted upon said frame and adapted for raising and lowering said plow, an upwardly and laterally extending belt conveyer hung from the waist portion of said frame, the inner and lower end of said conveyer being adapted to receive the dirt from said grading implement, adjusting devices mounted upon said frame and adapted for raising and lowering said conveyer, steering mechanism for controlling the forward running-gear, power-transmitting connection between the engine and the traction-wheels and also between the engine and the conveyer, and independent power-transmitting connection between the engine and the steering mechanism.

5. In a self-propelling ditching and grading machine, the combination of traction and steering wheels, a suitable boiler and engine, a plow and a transversely-arranged conveyer, power-transmitting connection between the engine and traction-wheels, power-transmitting connections for independently driving the conveyer, suitable steering mechanism, and independent power-transmitting connection between said engine and said steering mechanism.

6. An automobile grading and ditching machine, comprising traction and steering wheels, an upright boiler supported between the traction-wheels, a frame or body structure connecting the boiler with the running-gear of the steering-wheel, the boiler serving as connection between the said frame or body structure and the traction-wheels, a suitable engine mounted upon said frame or body structure and connected with said boiler, a grading-plow arranged to operate at one side of said frame or body structure, a horizontally-disposed and transversely-arranged belt conveyer suspended from the waist portion of said frame or body structure, the inner and lower end of said conveyer being adapted to receive the dirt from said plow, independent power-transmitting connections between the engine and traction-wheels and conveyer, said power-transmitting connections being controlled by levers arranged adjacent to said steering-wheel, hand-wheel shafts mounted upon said frame or body structure, and flexible connections between said shafts and the plow and conveyer.

7. A steam grader and ditcher, comprising traction and steering wheels, a suitable boiler and engine, a plow and a transversely-arranged belt conveyer, power-transmitting connections for driving the traction-wheels and the conveyer, and a tank arranged to serve as medium of connection between the traction and steering wheels, said tank and boiler being also connected and arranged to conjointly sustain the weight of said conveyer, and also of the plow, when the latter is raised from the ground.

8. In a steam ditcher and grader, the combination of traction and steering wheels, a boiler and engine, a suitable plow, a conveyer arranged to receive the dirt from the plow and carry the same to a suitable point of discharge, power-transmitting connections between the engine and the conveyer, and also between the engine and the traction-wheels, steering mechanism independently controlled at the forward end of the machine, and controlling devices at the forward end of the machine for independently controlling the different power-transmitting connections.

9. An automobile ditching and grading machine, comprising traction and steering wheels, an upright boiler supported between the traction-wheels, a horizontally-disposed tank forming medium of connection between the boiler and the forward running-gear, the boiler connecting the tank with the rear wheels, a suitable engine mounted upon said tank and connected with said boiler, piping for conducting oil or water or both from said tank to said boiler, a grading implement arranged to operate at one side of said tank, an upwardly-inclined and laterally-projecting conveyer hung from said tank, the inner and lower end of said conveyer being adapted to receive the dirt from said grading implement, power-transmitting connections for operating the conveyer, gearing between said engine and said traction-wheels, and adjusting devices mounted upon said tank and connected for raising and lowering the plow and conveyer.

10. An automobile excavating-machine, comprising traction and steering wheels, a prime mover for driving the traction-wheels, a fire-box structure supported between the traction-wheels, a horizontally-disposed tank serving as medium of connection between the fire-box structure and the forward running-gear, the said structure serving as a medium of connection between the said tank and traction-wheels, suitable piping for conducting fluid from said tank to said prime mover, the latter being constructed with a main crank-shaft, a longitudinally-arranged grading-plow, a transversely-arranged belt conveyer for receiving the dirt from said plow, independent power-transmitting connection between the conveyer and said crank-shaft, suitable steering mechanism and independently-controlled power-transmitting connection between said crank-shaft and said steering mechanism.

11. In a self-propelled ditching and grading machine, the combination of rear traction-wheels, an upright boiler supported between said traction-wheels, forward running-gear and steering mechanism, a horizontally-disposed tank extending between the boiler and forward running-gear, a grading-plow arranged to operate at one side of said tank, a transversely-arranged belt conveyer hung from said tank, the tank and boiler sustaining the weight of the conveyer, the said conveyer being arranged to receive the dirt from said plow, suitable piping for conducting oil or water or both from said tank to said boiler, steering mechanism, power-transmitting connection between the engine and the conveyer and traction-wheels, and independently-controlled power-transmitting connection between the engine and said steering mechanism.

12. In a grading and ditching machine, the combination of traction and steering wheels, excavating and conveying devices, a suitable prime mover, power-transmitting connection between the prime mover and the traction-wheels, power-transmitting connection between the prime mover and the conveying device, steering mechanism, power-transmitting connection between the prime mover and the steering mechanism, adjusting devices operable from the forward end of the machine and connected for raising and lowering the excavating and conveying devices, and controlling devices operable from the forward end of the machine and connected for independently controlling the different power-transmitting connections.

Signed by me at Chicago, Cook county, Illinois, this 30th day of October, 1901.

MORTON G. BUNNELL.

Witnesses:
ARTHUR F. DURAND,
HARRY P. BAUMGARTNER.